United States Patent
Ruehle et al.

(10) Patent No.: US 9,309,968 B2
(45) Date of Patent: Apr. 12, 2016

(54) SHIFT ARRANGEMENT FOR A MOTOR VEHICLE GEARBOX

(71) Applicant: GETRAG Getriebe- und Zahnradfabrik Hermann Hagenmeyer GmbH & Cie KG, Untergruppenbach (DE)

(72) Inventors: Guenter Ruehle, Loechgau (DE); Ralf Trutschel, Naumburg (DE)

(73) Assignee: GETRAG GETRIEBE- UND ZAHNRADFABRIK HERMANN HAGENMEYER GMBH & CIE KG, Untergruppenbach (DE)

( * ) Notice: Subject to any disclaimer, the term of this patent is extended or adjusted under 35 U.S.C. 154(b) by 623 days.

(21) Appl. No.: 13/660,687

(22) Filed: Oct. 25, 2012

(65) Prior Publication Data

US 2013/0104683 A1    May 2, 2013

(30) Foreign Application Priority Data

Oct. 26, 2011    (DE) .......................... 10 2011 117 486

(51) Int. Cl.
| | |
|---|---|
| F16H 59/10 | (2006.01) |
| F16H 61/30 | (2006.01) |
| F16H 63/30 | (2006.01) |

(52) U.S. Cl.
CPC ............ *F16H 61/30* (2013.01); *F16H 63/3023* (2013.01); *Y10T 74/20024* (2015.01)

(58) Field of Classification Search
CPC ............ F16H 61/30; F16H 2063/3023; F16H 2063/303
See application file for complete search history.

(56) References Cited

U.S. PATENT DOCUMENTS

| | | |
|---|---|---|
| 3,672,166 A | 6/1972 | Isaac |
| 3,864,911 A | 2/1975 | Gellatly et al. |

(Continued)

FOREIGN PATENT DOCUMENTS

| | | |
|---|---|---|
| CN | 102077002 | 5/2011 |
| DE | 20 65 423 C3 | 10/1973 |

(Continued)

OTHER PUBLICATIONS

Office Action received in corresponding Chinese Application No. 201210418237.2 dated Sep. 11, 2014 in 21 pages with translation.

(Continued)

*Primary Examiner* — Terence Boes
(74) *Attorney, Agent, or Firm* — Knobbe Martens Olson & Bear LLP

(57) ABSTRACT

Shift arrangement for a motor vehicle gearbox. The shift arrangement has a shift element which can be connected or is connected to a shift member. The shift arrangement has a hydraulic actuator by means of which the shift element can be moved in a first shifting direction and in an opposing second shifting direction. The hydraulic actuator comprises a double-acting hydraulic cylinder which has a first cylinder port and a second cylinder port. The shift arrangement has a hydraulic circuit which has a pump and is connected to the first and second cylinder ports. The pump is connected to an electric motor as a pump drive and is embodied as a bidirectional rotational pump which has a first pump port which is directly connected to the first cylinder port, and which has a second pump port which is directly connected to the second cylinder port. The shift element can be moved by changing the rotational speed and/or the direction of rotation of the electric motor.

11 Claims, 2 Drawing Sheets

(56) References Cited

U.S. PATENT DOCUMENTS

| | | | |
|---|---|---|---|
| 5,224,392 A * | 7/1993 | Hutchison | F16H 61/705 74/335 |
| 6,981,372 B2 | 1/2006 | Mentink et al. | |
| 7,300,375 B2 | 11/2007 | Petrzik | |

FOREIGN PATENT DOCUMENTS

| | | |
|---|---|---|
| DE | 38 37 777 A1 | 5/1990 |
| DE | 199 00 852 A1 | 7/1999 |
| DE | 10 2004 052 804 B3 | 10/2004 |
| DE | 103 20 524 A1 | 11/2004 |
| DE | 10 2004 015 756 A1 | 10/2005 |
| DE | 601 30 539 T2 | 1/2008 |
| DE | 10 2008 031 815 A1 | 12/2009 |
| DE | 10 2008 048 092 A1 | 3/2010 |
| DE | 11 2006 002 365 B4 | 6/2010 |
| DE | 10 2010 001 069 A1 | 7/2011 |
| EP | 0 087 794 A2 | 7/1983 |
| FR | 2807812 A1 * | 10/2001 ............ F15B 7/00 |
| WO | WO 00/12918 | 3/2000 |
| WO | WO 02/061 288 A2 | 8/2002 |

OTHER PUBLICATIONS

European Search Report for Application No. 12189240.0 dated Feb. 27, 2013 in 5 pages.

* cited by examiner

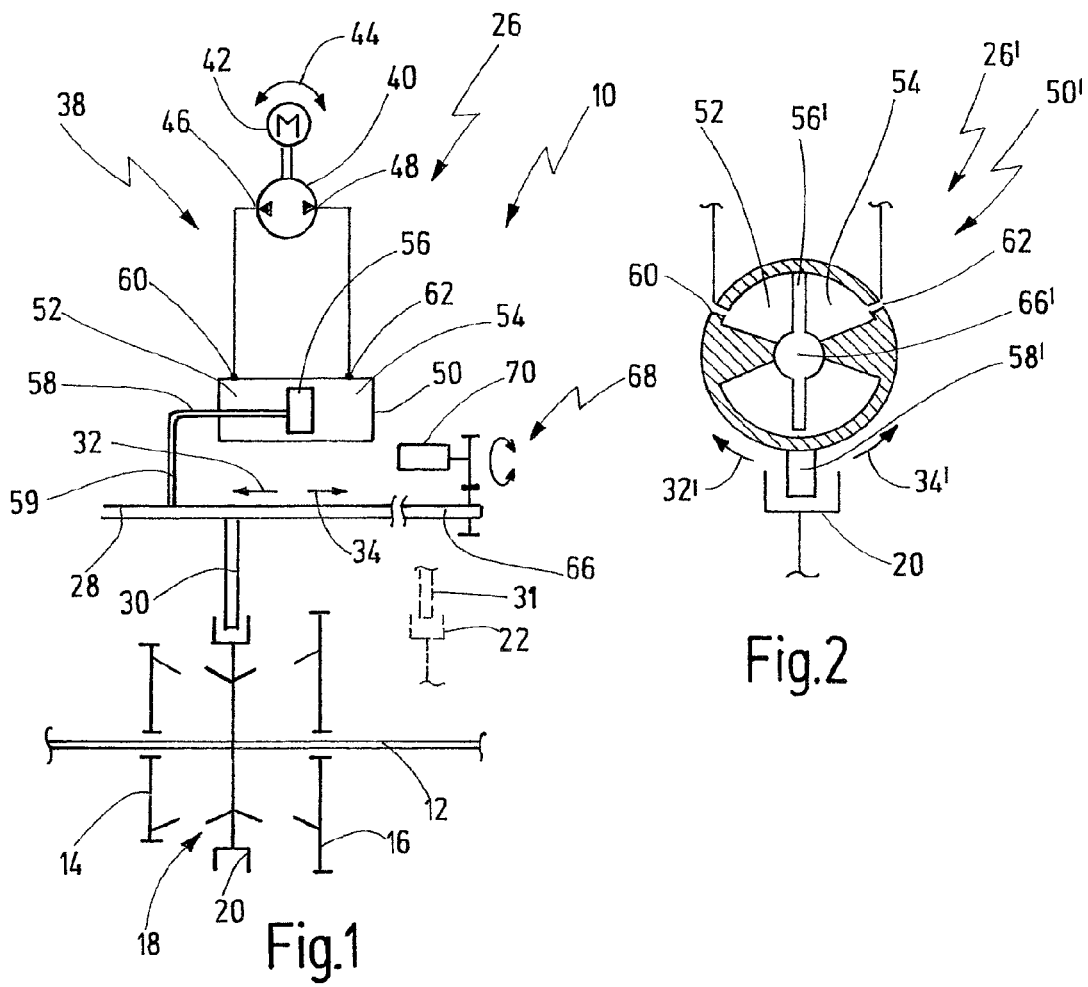
Fig.1
Fig.2
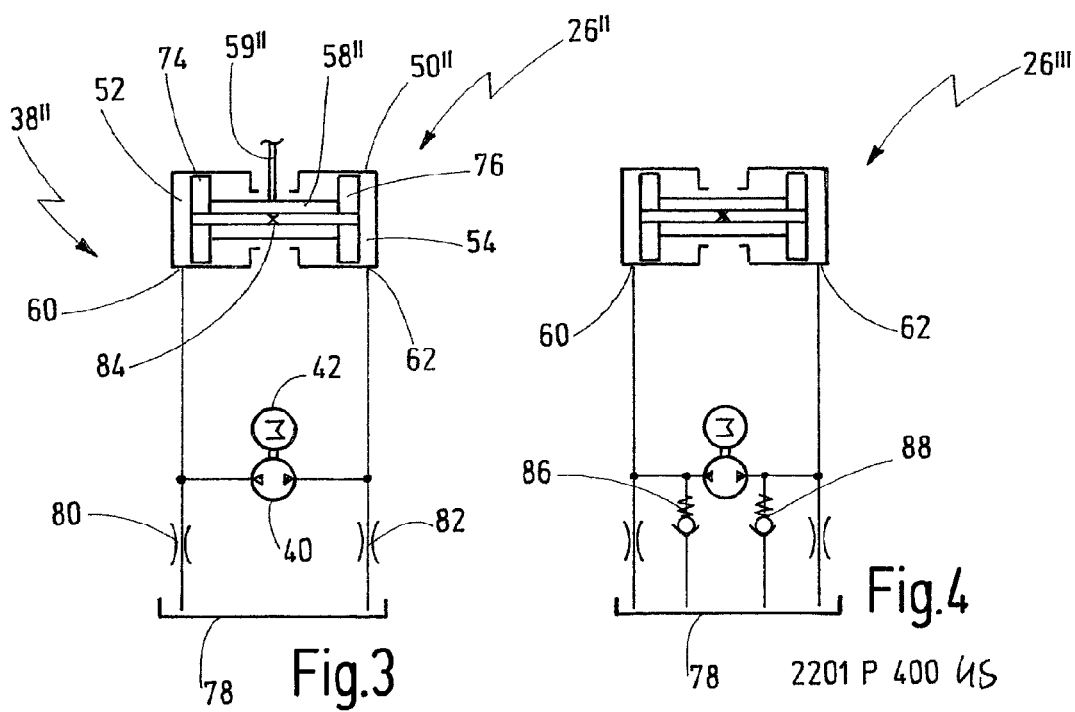
Fig.3
Fig.4

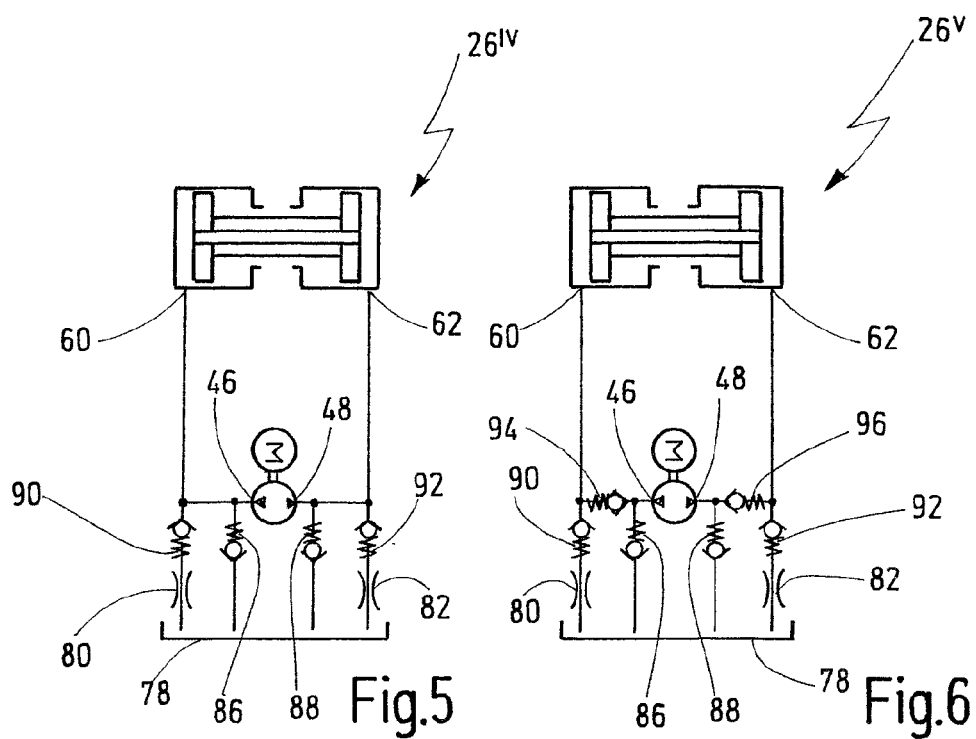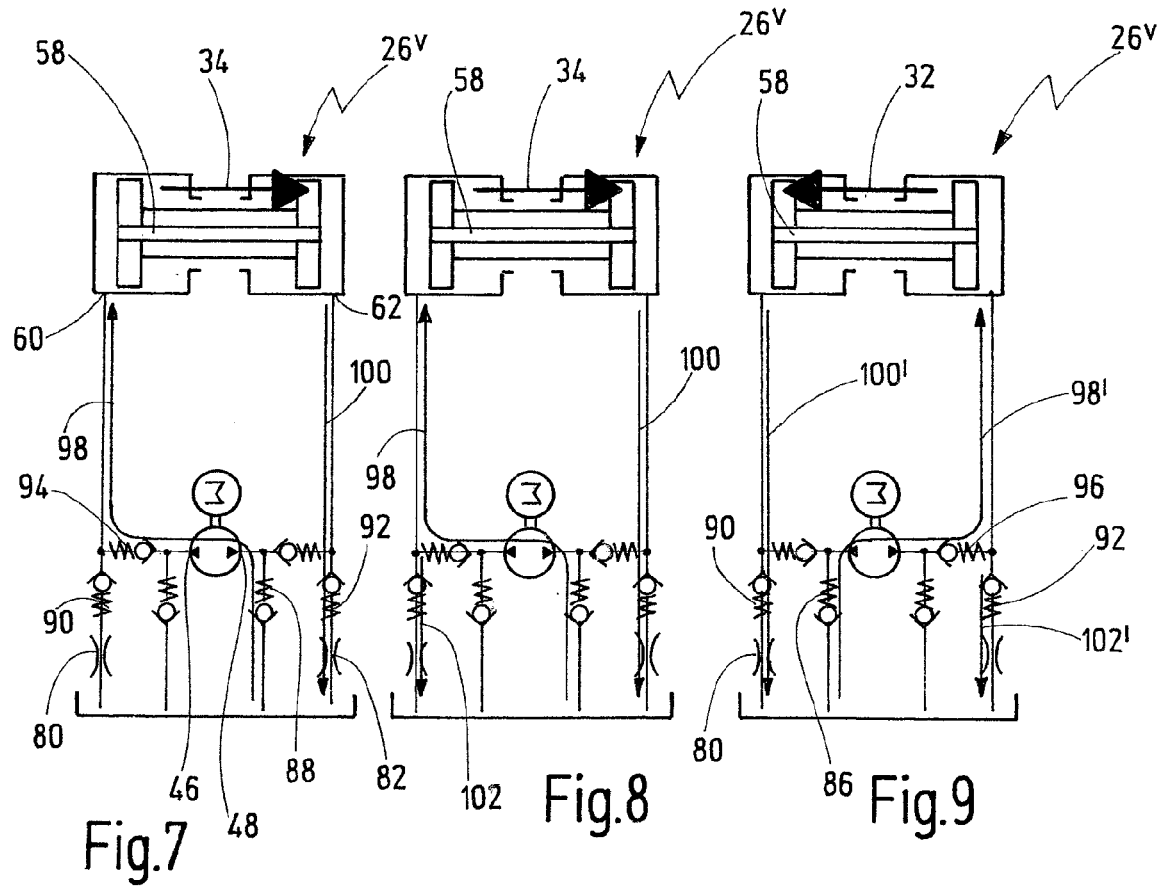

SHIFT ARRANGEMENT FOR A MOTOR VEHICLE GEARBOX

CROSS REFERENCE TO RELATED APPLICATIONS

This application claims the priority of German patent application DE 10 2011 117 486, filed Oct. 26, 2011.

BACKGROUND OF THE INVENTION

The present invention relates to a shift arrangement for a motor vehicle gearbox, having a shift element which can be connected or is connected to a shift member such as a shift fork, having a hydraulic actuator by means of which the shift element can be moved in a first shifting direction and in an opposing second shifting direction, wherein the hydraulic actuator comprises a double-acting hydraulic cylinder which has a first cylinder port and a second cylinder port, and having a hydraulic circuit which has a pump and which is connected to the first and second cylinder ports, wherein the pump is connected to a pump drive.

Such a shift arrangement can be used, in particular, for the automated activation of shift clutches, such as can be used in motor vehicle gearboxes which are constructed according to the lay shaft principle. The shift clutches are preferably constructed here as synchronous shift clutches, and as a rule in each case two synchronous shift clutches are combined to form one shift clutch packet such that the two shift clutches can be opened and closed by means of a shift member such as a shift fork, in order to engage and disengage gear speed stages of the motor vehicle gearbox.

In the case of manual shift gearboxes, the shift clutches are activated by a driver with muscle force. In automated forms of such motor vehicle gearboxes such as, for example, automatically controlled transmissions (ACT), double clutch transmissions (DCT) and the like, the shift clutches are activated by extraneous force by means of actuators. The actuators can operate according to electrical, hydraulic and pneumatic active principles.

In motor vehicle transmissions such as are used, in particular, in passenger cars, in particular hydraulic actuators and electric motor actuators as well as combinations thereof are used.

Electric motor actuators are frequently used in combination with shift drums. However, these have basically the disadvantage of purely sequential activation.

Furthermore it is known to provide for each shift clutch packet, a shift rod which is activated by means of an associated actuator, in particular by means of a double-acting hydraulic cylinder. In such hydraulic actuators, generally a pump is provided which is frequently driven via the drive motor (internal combustion engine) and generates a line pressure on its pressure side. Line pressure is adjusted by means of a pressure control valve which is actuated electromagnetically. Such valves require a high degree of cleanliness during the fabrication and during the mounting of such hydraulic circuits. The necessary actuating pressures for the hydraulic actuators are likewise typically generated here by means of electromagnetically actuated valves which are generally embodied as directional control valves.

Because the pump is coupled to the drive motor, a relatively large requirement of auxiliary energy occurs continuously during operation of the vehicle, while electromechanical actuators generally only require auxiliary energy when a shift process is to be actually carried out.

In addition, in such systems the engagement and disengagement of gear speeds is generally possible only when the drive motor is running, with the result that in modern drive concepts (hybrid drives) restrictions arise with respect to the functionality. However, electromechanical actuators are generally very large in size and become geometrically awkward in shape owing to the necessary ratio gearboxes (gear mechanisms) and the transmission mechanics (shift drum). It is therefore difficult to arrange such electromechanical actuators in a gear mechanism package. In particular in the case of longitudinal in-line drive trains, the use of such actuators is frequently not possible owing to the narrow spatial conditions.

Instead of the above-mentioned shift rods, which are each assigned to a shift clutch packet, shift arrangements are also known which use one or more shift shafts. Such shift shafts can be moved both in a shifting direction and in a selecting direction. In the case of a movement in a selecting direction, in each case a shift packet is selected, for example by means of shift fingers on the shift shaft. Document DE 10 2004 052 804 B3 discloses a shift arrangement for an automated multi-step gearbox which has two shift shafts. Each of the shift shafts can be moved in a shifting direction (longitudinal direction), by means of an associated, double-acting hydraulic cylinder. In addition, an electric motor for rotating the shift shaft in the selecting direction is provided for each shift shaft. In addition, this document is concerned with mechanical locking devices which, are, however, not a subject matter of the present application.

Document DE 10 2008 031 815 A1 discloses a further shift arrangement which has a shift shaft on which a multiplicity of driver fingers are arranged for each shift clutch packet, with the result that it is possible to couple the respective shift member and the shift shaft in a multiplicity of relative axial positions with respect to one another. In this shift arrangement, a separate electric motor is respectively provided for the movement of the shift shaft in the shifting direction and for the movement of the shift shaft in the selecting direction.

BRIEF SUMMARY OF THE INVENTION

Against the above background, an object of the invention is to specify an improved shift arrangement and an improved motor vehicle gearbox having such a shift arrangement, wherein the shift arrangement has a high level of efficiency and is of compact design, with the result that it can be integrated into motor vehicle gearboxes with restricted spatial conditions.

This object is achieved with the shift arrangement specified at the beginning in that the pump is connected to an electric motor as a pump drive and is embodied as a bidirectional rotational pump which has a first pump port which is directly connected to the first cylinder port, and which has a second pump port which is directly connected to the second cylinder port, in such a way that the shift element can be moved by changing the rotational speed and/or the direction of rotation of the electric motor.

By means of the measure of connecting the pump to an electric motor as a pump drive it is possible to operate the shift arrangement independently of a drive motor. The use in hybrid drive trains is therefore also possible. For example, gear speed changes can also be carried out in a purely electric-motor drive mode.

In addition, the pump is embodied as a bidirectional rotational pump, with the result that in one direction of rotation it can move the hydraulic cylinder in the one shifting direction, and in the other direction of rotation it can move the hydraulic cylinder in the second shifting direction. As a result, complex solenoid valves are eliminated.

However, it is of particular importance that the pump is connected by its first pump port directly to the first cylinder port, and by its second port directly to the second cylinder port. The shift arrangement consequently departs from the concept of generating, by means of a pump and a pressure control valve, a line pressure from which actuating pressures are then derived. Instead, depending on its rotational speed the pump generates a pressure which can be used directly to move a piston of the hydraulic cylinder.

A direct connection is intended to be understood here as meaning that the pump port and the cylinder port are each connected to one another via a preferably uninterrupted line, wherein, in particular, no separate pressure control valve is provided for controlling the pressure. In particular, no slider valves are necessary in the hydraulic circuit. A direct connection is, however, also to be understood as meaning that the pump port and the cylinder port are connected to one another via a simple non-return valve, as will also be explained below. A non-return valve is a valve of simple design without electromagnetic actuation, which, in particular, makes no stringent requirements in terms of the cleanliness during fabrication and mounting.

The hydraulic circuit which is used to activate the hydraulic cylinder can consequently be constructed substantially without complex solenoid valves, with the result that no stringent requirements are made in terms of cleanliness during fabrication and mounting.

In order to secure the hydraulic actuator in the various shift positions (in particular a shift position for engaging a gear speed in the first shifting direction, a shift position for engaging a gear speed in the second shifting direction and, if appropriate, a neutral position located between them), a mechanical latching device may be provided which holds the shift element in the respective positions. In this embodiment it is not necessary continuously to generate a volume flow by means of the pump for the engagement of a gear speed.

Alternatively, it is, however, also possible to provide a shift arrangement without such a latching device, in which case a pressure from the pump is necessary both for setting and for holding the shift position.

In the shift arrangement according to the invention, the pressure in the hydraulic cylinder is built up by means of the volume flow generated by the pump. The volume flow is in turn controlled by means of the rotational speed of the electric motor, preferably as a function of the temperature.

With such a shift arrangement, positional accuracy and control dynamics can be achieved of a similar quality to those of actuator arrangements described in the introduction.

Measures for ensuring that the hydraulic circuit is reliably vented during activation and that no air is sucked in during operation are preferably taken in the hydraulic circuit.

The pump and the electric motor may be arranged flexibly and independently of the design of the gearbox, with the result that the shift arrangement can also be used in motor vehicle gearboxes with narrow installation spaces. The pump can then be connected via hydraulic lines to the hydraulic cylinder which is arranged structurally close to the shift element.

A double-acting hydraulic cylinder may comprise an arrangement having one cylinder and one piston, but may also comprise two single-acting cylinders, the pistons of which are coupled to each other.

The above object is also achieved by means of a motor vehicle gearbox having a plurality of gear stages, at least one of which can be engaged and disengaged by means of a shift member such as a shift fork, wherein the shift member is connected to a shift arrangement of the type described above.

The object is therefore completely achieved.

In one embodiment, it is particularly preferred if the shift element is embodied as a shift rod which can be connected or is connected to a shift member.

In this embodiment it is possible to provide a separate hydraulic cylinder for each shift rod, it being preferred here if each hydraulic cylinder is assigned a separate bidirectional rotational pump which is driven by electric motor. Alternatively it is possible to connect a single rotational pump to the different hydraulic cylinders via a directional valve arrangement.

It is advantageous in this embodiment that the individual shift clutch packets can be activated substantially independently of one another.

In an alternative embodiment, which is to be considered particularly preferred here, the shift element is embodied as a shift shaft which can be coupled to a multiplicity of shift members (for example by means of shift fingers), wherein the hydraulic actuator is designed to axially move or to rotate the shift shaft. In other words, the hydraulic actuator is designed to move the shift shaft in the shifting direction.

In this embodiment it is possible to engage and disengage all the gear stages of the motor vehicle gearbox by means of a single hydraulic actuator and a single bidirectional rotational pump which is driven by electric motor.

Alternatively it is possible to provide a shift arrangement with two shift shafts, each of which is assigned a separate hydraulic cylinder and a separate pump, with a design such as is described, for example, in the document DE 10 2004 052 804 B3.

The shift shaft can also be embodied in the way described in document DE 10 2008 031 815 A1. In other words, the shift shaft can have, for coupling to each shift member, a multiplicity of axially displaced shift noses or shift fingers in order to couple the shift shaft to the respective shift member in a multiplicity of relative axial positions.

This configuration makes it possible, in particular in the case of a double clutch gearbox, to allow a gear stage to be maintained in an active partial gearbox, while in the inactive partial gearbox a target gear speed is engaged. In general, in the variant described above it is preferable if the shift shaft is moved axially for the purpose of shifting. However, it is also alternatively possible to rotate the shift shaft in order to move it in the shifting direction.

In all cases it is preferred if in order to move the shift shaft in the selecting direction a selector drive is provided which is configured to move the shift shaft in such a way that it is coupled to, in each case, one of the shift members, wherein the hydraulic actuator is connected to the shift shaft in such a way that it moves the shift member, which is respectively coupled to the shift shaft, in the first or second shifting direction.

In general it is possible also to move the selector drive by means of a hydraulic cylinder (for example by means of a single-acting hydraulic cylinder or by means of a double-acting hydraulic cylinder). However, it is particularly preferred if the selector drive has an electric drive.

Since the forces which are necessary for selecting movements are only very small, the electric selector drive may be implemented without complex transmission ratio means, with the result that such a selector drive can be integrated relatively easily even under narrow installation space conditions.

In one particularly preferred embodiment, the connections between the pump ports and the cylinder ports are each connected to a low-pressure region, in particular a tank, via a restrictor or orifice.

The restrictor or the orifice are preferably uncontrolled hydraulic elements and serve to configure a predetermined low leakage rate. This allows stressing of the hydraulic system to be avoided.

It is also particularly preferred if the pressure in the connection between the respective pump port and the respective cylinder port is measured. In this case it is possible to feed-back control the pressure. The feed-back control system which is used here can be stabilized by making available such a restrictor or orifice.

It is also advantageous if the connections between the pump ports and the cylinder ports are each connected to a low-pressure region via a suction valve which is embodied as a non-return valve.

As a result it is possible to avoid a situation in which a considerable suction partial vacuum arises in the suction-side cylinder chamber. The suction pressure is determined, in particular limited here by means of the suction valve. The pre-stressing of the suction valve can be very small here.

In the embodiment in which the connections between the pump ports and the cylinder ports are each connected to a low-pressure region via a restrictor or orifice, it is of particular advantage if these connections are each connected to the restrictor or orifice via a pressure-limiting valve which is embodied as a non-return valve.

As a result, there is no leakage loss below the opening pressure of the pressure-limiting valve, with the result that the piston of the hydraulic cylinder can be moved spontaneously.

In addition, it is preferred overall if the pump ports are each connected to the respective cylinder ports via a threshold valve which is embodied as a non-return valve.

In this context, the suction region of the pump can, in each case, be decoupled completely from the suction-side cylinder chamber, with the result that no partial vacuum arises in the suction-side cylinder chamber. Since the above-mentioned valves are each embodied as single non-return valves, which are preferably spring-prestressed, no stringent requirements in terms of cleanliness during production and mounting arise during the integration of said valves in the hydraulic circuit (such as would be the case with slider valves, for example).

In addition, the respective prestressing of the non-return valves may be relatively small, with the result that the hydraulic losses are low.

In the case of the suction valve, the spring prestress may be, for example, 0 N. The blocking effect may be implemented solely through the weight of the blocking ball and the liquid column located above it.

In general it is possible to equip the double-acting hydraulic cylinder with a single piston which is connected to a piston rod, which is in turn connected to the shift element.

It is particularly advantageous if the two cylinder spaces of the hydraulic cylinder are connected to one another via a restrictor or orifice.

As a result, better venting can be implemented.

In addition it is preferred if the double-acting hydraulic cylinder has two pistons which are connected to one another via a piston rod which is connected to the shift element.

As a result, the shift element can be connected to the piston rod symmetrically with respect to the two pistons, with the result that no stresses can arise. The double-acting hydraulic cylinder is preferably realized by two single-acting cylinders which preferably operate in a push-pull manner.

Of course, the features which are mentioned above and which are still to be explained below can be used not only in the respectively specified combination but also in other combinations or alone without departing from the scope of the present invention.

BRIEF DESCRIPTION OF THE SEVERAL VIEWS OF THE DRAWING

Exemplary embodiments of the invention are illustrated in the drawing and explained in more detail in the following description, in which:

FIG. 1 shows a schematic illustration of a motor vehicle gearbox with a first embodiment of a shift arrangement according to the invention;

FIG. 2 shows a schematic illustration of a further embodiment of a shift arrangement according to the invention;

FIG. 3 shows a schematic illustration of a further embodiment of a shift arrangement according to the invention;

FIG. 4 shows a schematic illustration of a further embodiment of a shift arrangement according to the invention;

FIG. 5 shows a schematic illustration of a further embodiment of a shift arrangement according to the invention;

FIG. 6 shows a schematic illustration of a further embodiment of a shift arrangement according to the invention;

FIG. 7 shows the shift arrangement in FIG. 6 during a movement of the shift element in the second shifting direction in the case of a low piston force;

FIG. 8 shows a shift arrangement in FIG. 6 during a movement of the piston in the second shifting direction in the case of a high piston force; and FIG. 9 shows the shift arrangement in FIG. 6 during a movement of the piston in the first shifting direction in the case of a high piston force.

DETAILED DESCRIPTION OF THE INVENTION

A motor vehicle gearbox is illustrated schematically in FIG. 1 and is denoted generally by 10.

The motor vehicle gearbox 10 is of a lay shaft design and has a shaft 12 on which a first freely moving gear wheel 14 and a second freely moving gear wheel 16 are rotatably mounted.

A shift clutch packet 18, which has two synchronous shift clutches, is arranged between the two freely moving gear wheels 14, 16. A shift sleeve 20 serves to shift the clutch packet 18. The motor vehicle gearbox 10 also has a further shaft (not illustrated) on which two fixed gear wheels are arranged, which fixed gear wheels engage with the two freely moving gear wheels 14, 16, with the result that a gear stage can be implemented in each case via a freely moving gear wheel and a fixed gear wheel.

Most motor vehicle gearboxes of this type have five, six, seven or more gear stages. In a corresponding way, a further number of shift clutch packets are provided in the motor vehicle gearbox 10, wherein a further shift sleeve is indicated schematically at 22.

In order to activate the shift sleeve 20 (and, if appropriate, the shift sleeve 22 as well as further shift sleeves), a shift arrangement 26 is provided.

In one embodiment, the shift arrangement 26 has a shift rod 28 which can be connected or is connected to a shift fork 30 (or a shift rod).

If appropriate, the motor vehicle gearbox 10 also has further shift forks, one of which is shown schematically at 31.

The shift rod 28 can be moved by means of the shift arrangement 26 in a first shifting direction 32 in order to connect the shaft 12 to the first freely moving gear wheel 14 in a rotationally fixed fashion. In addition, the shift rod 28 can be moved in a second shifting direction 34 by means of the shift arrangement 26 in order to connect the shaft 12 to the second freely moving gear wheel 16 in a rotationally fixed fashion. In the neutral position shown in FIG. 1, the shaft 12 is decoupled in terms of rotation both from the freely moving gear wheel 14 and from the freely moving gear wheel 16.

The shift arrangement 26 has a hydraulic circuit 38. The hydraulic circuit 38 contains a bidirectional rotational pump 40, which is driven by means of an electric motor 42. The direction of rotation of the electric motor 42 is also indicated schematically as bidirectional in FIG. 1 at 44.

The pump 40 has a first pump port 46 and a second pump port 48. The pump ports are embodied as a pressure port or as a suction port depending on the direction of rotation.

The hydraulic circuit 38 also has a double-acting hydraulic cylinder 50 with a first cylinder space 52 and a second cylinder space 54. The cylinder spaces 52, 54 are separated from one another by a piston 56. The piston 56 is connected to a piston rod 58 which is connected to the shift rod 28 via a schematically indicated connecting member 59.

The hydraulic cylinder 50 also has a first cylinder port 60 which is connected to the first cylinder space 52, and a second cylinder port 62 which is connected to the second cylinder space 54.

The first pump port 46 is connected directly, that is to say without intermediate connection of pressure control valves or other slider valves, to the first cylinder port 60. The second pump port 48 is connected directly to the second cylinder port 62.

If the pump 40 is not driven, the shift arrangement 26 remains in the illustrated position. For the neutral position and the two shift positions of the shift clutch packet 18 it is possible, if appropriate, to provide a latching device.

If the pump 40 is moved in a first direction of rotation by means of the electric motor 42, the first pump port 46 serves as a suction port, and the second pump port 48 serves as a pressure port. Consequently, the piston 56 in FIG. 1 is moved to the left in the first shifting direction 32, in order to connect the shaft 12 to the first freely moving gear wheel 14 in a rotationally fixed fashion. In order to release this connection, the direction of rotation of the pump is reversed, with the result that the first pump port 46 becomes a pressure port, and the second pump port 48 becomes a suction port. As a result, the piston 56 is moved to the right, in order to move the shift clutch packet 18 either into the neutral position or else in the second shifting direction 34 in order to connect the shaft 12 to the second freely moving gear wheel 16.

In the embodiment described above, the shift member 30 is moved by means of a shift rod 28. Further shift members 31 can each be assigned a separate shift rod. In this case, it is preferred if each shift rod is assigned a separate combination of a hydraulic cylinder 50, pump 40 and electric motor 42.

In an alternative embodiment, the shift member 30 and further shift members 31 can be connected to a shift shaft 66. In this context, the shift shaft 66 is rotated by means of a selector drive 68, which can have, for example, a second electric motor 70. By rotating the shift shaft 66, the shift shaft is coupled, in each case, to one of the shift members 30, 31 etc. in order then to move the respectively coupled shift member in the shifting direction by means of the shift arrangement 26.

FIG. 2 shows an alternative embodiment in which a shift shaft 66' is rotated for the purpose of shifting and is moved axially for the purpose of selecting. FIG. 2 shows here just one alternative embodiment of a shift arrangement 26' which is designed to rotate the shift shaft 66'. Here, a hydraulic cylinder 50' is embodied as a double-acting rotary piston cylinder, wherein the rotary piston 56' is connected to the shift shaft 66'. The cylinder spaces 52, 54 are, as in the embodiment in FIG. 1, connected to the first pump port 46 or the second pump port 48.

The following FIGS. 3 to 6 illustrate further embodiments of shift arrangements which generally correspond to the shift arrangement 26 in FIG. 1 in terms of design and function. The same elements are therefore characterized by the same reference symbols. The text which follows essentially explains the differences.

In the circuit arrangement 26" in FIG. 3, the hydraulic cylinder 50" has a first piston 74 and a second piston 76. The two pistons 74, 76 are connected to one another via a piston rod 58". Here, the double-acting cylinder is realized by two single-acting cylinders. The piston rod 58" is connected between the two pistons 74, 76 with a connecting member 59" which can be connected, for example, to the shift shaft 66.

In addition, FIG. 3 shows that the hydraulic circuit has a first orifice 80 and a second orifice 82. The first orifice 80 connects the first cylinder port 60 to a tank 78. The second orifice 82 connects the second cylinder port 62 to the tank 78.

Accordingly, on the pressure side of the pump 40 (depending on the direction of rotation), in each case a leak occurs via the respective orifice 80, 82 towards the tank 78, as a result of which the controllability and the response behaviour can be improved. In this way it is also possible to avoid stresses of the hydraulic circuit 38". At the same time, on its respective suction side the pump 40 sucks hydraulic fluid not only via the suction-side cylinder space but also via the respective orifice 82. In addition, a further orifice 84, which connects the cylinder spaces 52, 54 to one another, is preferably integrated into the hydraulic cylinder 50". As a result, the venting of the hydraulic circuit 38" can be improved.

FIG. 4 shows a further circuit arrangement 26''' which generally corresponds to the shift arrangement 26" in FIG. 3 in terms of design and function. In addition, the first cylinder port 60 (or the connection between the first cylinder port 60 and the assigned pump port) is connected here to the tank 78 via a first suction valve 86. In a corresponding way, the second cylinder port 62 (or the connection between it and the assigned pump port) is connected to the tank 78 via a second suction valve 88. The suction valves 86, 88 are embodied as pressure-limiting valves such that starting from a certain partial vacuum on the suction side of the pump 40 hydraulic fluid is sucked in directly from the tank 78. On the respective current pressure side of the pump 40, the suction valve blocks. The spring prestress of the suction valves 86, 88 can be very low here, for example with a spring force of 0 N. As a result, the suction partial vacuum in the suction-side cylinder space can be reduced.

FIG. 5 shows a further embodiment of a shift arrangement $26^{IV}$, which generally corresponds to the shift arrangement 26''' in FIG. 4 in terms of design and method of functioning.

In addition to this, the connection between the first pump port 46 and the first cylinder port 60 is connected to the first orifice 80 via a first pressure-limiting valve 90. In a corresponding way, the connection between the second pump port 48 and the second cylinder port 62 is connected to the second orifice 82 via a second pressure-limiting valve 92.

As a result of the pressure-limiting valves 90, 92 which are embodied as non-return valves, the orifices 80, 82 only take effect above a specific pressure. As a result, below the opening pressure of the pressure-limiting valves 90, 92 there is no leakage loss, and rapid and sensitive movements of the piston rod 58 can therefore also be achieved.

In this context, a counter pressure is always generated in the suction-side cylinder space, with the result that a relatively high pressure demand occurs in the pressure-side cylinder space.

FIG. 6 shows a further embodiment of a shift arrangement $26^V$, which generally corresponds to the shift arrangement $26^{IV}$ in FIG. 5 in terms of design and method of functioning. In addition, in this context a first threshold valve 94 in the form of a non-return valve is arranged between the first pump port 46 and the first cylinder port 60. In a corresponding way, a second threshold valve 96 in the form of a non-return valve is arranged between the second pump port 48 and the second cylinder port 62. The non-return valves 94, 96 are arranged here between the hydraulic taps for the suction valves 86, 88 and the hydraulic taps for the orifices 80, 82 (or the pressure-limiting valves 90, 92). As a result of the threshold valves 94, 96, the suction range of the pump 40 is completely decoupled from the suction-side cylinder space, with the result that a partial vacuum can never occur in the suction-side cylinder space. In this context, the entire, suction-side volume flow has to be sucked in from the tank 78 (the sump), specifically via the respective suction valve 86, 88.

FIGS. 7 to 8 show the shift arrangement $26^V$ in respective different operating states.

FIG. 7 shows a state in which the piston rod 58 is moved to the right (in the second shifting direction 34). In this context, the electric motor is set in rotation in such a way that the first pump port 45 is a pressure port, and the second pump port 48 is a suction port. Hydraulic fluid is sucked in here from the tank via the second suction valve 88 and fed to the first cylinder port 60 via the first threshold valve 94. The first pressure-limiting valve 90 is still closed here. In other words, the pressure which is built up at the first cylinder port 60 is still so low that the first pressure-limiting valve 90 is still closed. In this respect, a movement of the piston rod 58 occurs in the second shifting direction 34 with a low force.

If the rotational speed of the motor is increased, a relatively high pressure arises from the pressure side, wherein the first pressure-limiting valve 90 is opened and a leak occurs via the first orifice 80, as is shown in FIG. 8. By increasing the rotational speed of the electric motor it is possible to increase the pressure in order to move the piston rod 58 in the second shifting direction 34 with a high force.

FIG. 9 shows an illustration, corresponding to FIG. 8, of the shift arrangement $26^V$, wherein the pressure side and the pressure side of the pump are interchanged, with the result that fluid is sucked in via the first suction valve 86, and on the pressure side of the pump fluid is fed via the second threshold valve 96 to the second cylinder space (the second cylinder port), wherein the second pressure-limiting valve 92 has opened, with the result that a leakage flow is established.

In FIG. 7, the fluid flow which is thus established to the cylinder port 60 is denoted by 98, wherein the return flow 100 from the tapering cylinder space occurs to the tank 78 via the second pressure-limiting valve 92. The same flows 98, 100 occur in FIG. 8, wherein a second return flow 102 is established to the tank via the first pressure-limiting valve 90 and the first orifice 80. The corresponding flows are denoted by 98', 100' and 102' in FIG. 9.

What is claimed is:

1. Shift arrangement for a motor vehicle gearbox, having a shift element which can be connected or is connected to a shift member, having a hydraulic actuator by means of which the shift element can be moved in a first shifting direction and in an opposing second shifting direction, wherein the hydraulic actuator comprises a double-acting hydraulic cylinder which has a first cylinder port and a second cylinder port, and having a hydraulic circuit which has a pump and is connected to the first and second cylinder ports, wherein the pump is connected to a pump drive, wherein the pump is connected to an electric motor as a pump drive and is embodied as a bidirectional rotational pump which has a first pump port which is directly connected to the first cylinder port, and which has a second pump port which is directly connected to the second cylinder port, in such a way that the shift element can be moved by changing at least one of the rotational speed and the direction of rotation of the electric motor, and wherein the double-acting hydraulic cylinder has two cylinder spaces which are connected to one another via a restrictor or orifice, said restrictor or orifice being integrated into the double-acting hydraulic cylinder, so that venting of the hydraulic circuit can be improved.

2. Shift arrangement according to claim 1, wherein the shift element is embodied as a shift rod which can be connected or is connected to a shift member.

3. Shift arrangement according to claim 1, wherein the shift element is embodied as a shift shaft which can be coupled to a multiplicity of shift members, and wherein the hydraulic actuator is designed to axially move or to rotate the shift shaft.

4. Shift arrangement according to claim 3, wherein a selector drive is configured to move the shift shaft in such a way that it is coupled to, in each case, one of the shift members, and wherein the hydraulic actuator is connected to the shift shaft in such a way that the hydraulic actuator moves the shift member, which is respectively coupled to the shift shaft, in the first or the second shifting direction.

5. Shift arrangement according to claim 4, wherein the selector drive has an electric drive.

6. Shift arrangement according to claim 1, wherein connections between the pump ports and the cylinder ports are each connected to a low-pressure region via a restrictor or orifice.

7. Shift arrangement according to claim 1, wherein connections between the pump ports and the cylinder ports are each connected to a low-pressure region via a suction valve which is embodied as a non-return valve.

8. Shift arrangement according to claim 1, wherein connections between the pump ports and the cylinder ports are each connected to the restrictor or orifice via a pressure-limiting valve which is embodied as a non-return valve.

9. Shift arrangement according to claim 1, wherein the pump ports are each connected to the respective cylinder ports via a threshold valve which is embodied as a non-return valve.

10. Shift arrangement according to claim 1, wherein the double-acting hydraulic cylinder has two pistons which are connected to one another via a piston rod which is connected to the shift element.

11. Motor vehicle gearbox comprising a plurality of gear stages, at least one of which can be engaged and disengaged by means of a shift member and comprising a shift arrangement having a shift element that can be connected or is connected to the shift member, having a hydraulic actuator by means of which the shift element can be moved in a first shifting direction and in an opposing second shifting direction, wherein the hydraulic actuator comprises a double-acting hydraulic cylinder which has a first cylinder port and a second cylinder port, and having a hydraulic circuit which has a pump and is connected to the first and second cylinder ports, wherein the pump is connected to a pump drive, wherein the pump is connected to an electric motor as a pump drive and is embodied as a bidirectional rotational pump which has a first pump port which is directly connected to the first cylinder port, and which has a second pump port which is directly connected to the second cylinder port, in such a way that the shift element can be moved by changing at least one of the rotational speed and the direction of rotation of the electric motor, and wherein the double-acting hydraulic cylinder has two cylinder spaces which are connected to one another via a restrictor or orifice, said restrictor or orifice being integrated into the double-acting hydraulic cylinder, so that venting of the hydraulic circuit can be improved.

* * * * *